March 3, 1959 E. E. SUMNER 2,876,367
MONOSTABLE TRANSISTOR CIRCUIT
Filed May 16, 1955
FIG. 1
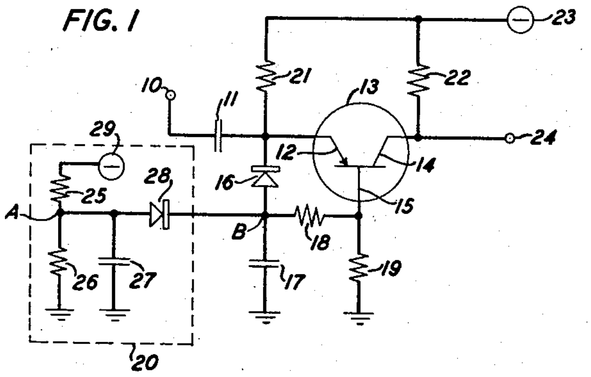
FIG. 2
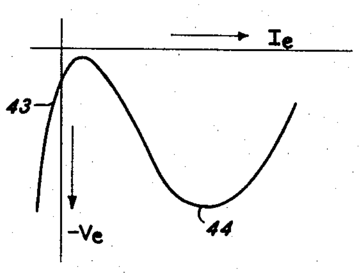
FIG. 3
FIG. 3A, FIG. 3B, FIG. 3C
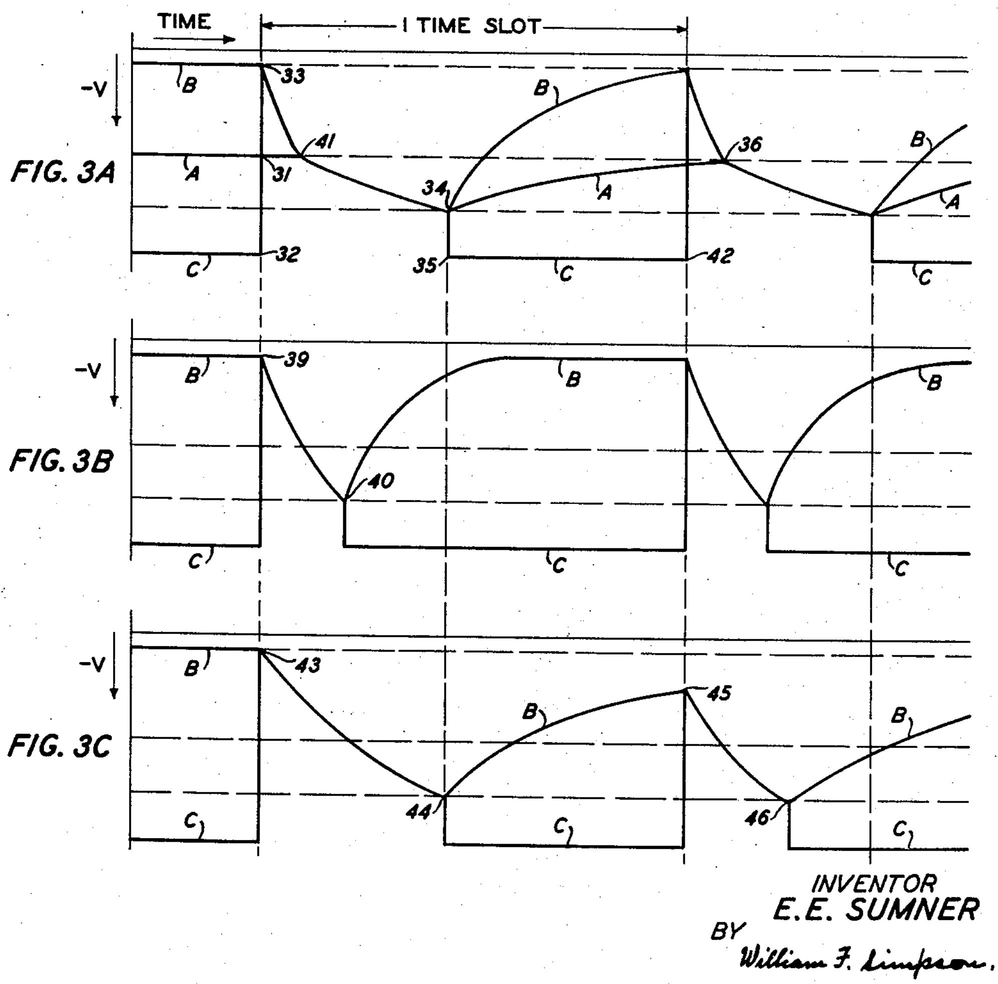
INVENTOR
E. E. SUMNER
BY William F. Simpson,
ATTORNEY United States Patent Office 2,876,367

Patented Mar. 3, 1959

2,876,367

MONOSTABLE TRANSISTOR CIRCUIT

Eric E. Sumner, North Caldwell, N. J., assignor to Bell Telephone Laboratories, Incorporated, New York, N. Y., a corporation of New York Application May 16, 1955, Serial No. 508,549

12 Claims. (Cl. 307—88.5)

This invention relates to transistor trigger circuits and more particularly to transistor monostable pulse amplifiers.

A trigger circuit is one which generally has at least one equilibrium position and which can be rapidly shifted, displaced or triggered from that condition. Devices such as transistors which have a current amplification factor greater than one lend themselves to trigger circuit applications. By connecting a relatively large impedance to the base electrode of the transistor, the transistor input characteristic has a negative resistance region. By triggering the circuit is meant the causing of the transistor to rapidly pass from an equilibrium condition through the negative resistance region. Such trigger circuits having a transistor and a base impedance are disclosed, for example, in the Patent 2,629,833 which issued to R. L. Trent on February 24, 1953 and the Patent 2,670,445 which issued to J. H. Felker on February 23, 1954.

Trigger circuits may be monostable, having one equilibrium condition, astable, having no equilibrium condition, or bistable, having two equilibrium conditions. The type of trigger circuit depends upon whether the load line intersects the input characteristic in one of its positive resistance regions, in its negative resistance region, or in all three regions. A monostable trigger circuit generally contains an emitter capacitor or other energy storing device which in part determines the duration of the output pulse. The longer the required output pulse, the larger must be the emitter capacitor. The larger the emitter capacitor, however, the longer must be the interpulse interval to allow the trigger circuit to return to its equilibrium condition to maintain the sensitivity of the trigger circuit. The requirement, therefore, for high duty cycle pulses is in direct antitheses with the requirement for maintaining the circuit sensitivity.

It is an object of the present invention to provide a sensitive monostable pulse amplifier which supplies output pulses of relatively high duty cycle or long duration.

In accordance with an embodiment of the present invention, a pulse extension circuit is utilized to accomplish the above object. The extension circuit includes a relatively large capacitor connected by a varistor to a relatively small emitter capacitor. During the equilibrium condition, the varistor functionally disconnects the large capacitor in the extension circuit. When the monostable circuit is triggered, the varistor is forward-biased to connect the large capacitor to the small emitter capacitor. The large capacitor functions as a supplementary source of current to extend the duration of the output pulse. As the monstable circuit returns to its quiescent condition, the extension circuit is once again functionally disconnected and the small emitter capacitor rapidly discharges. As soon as the emitter capacitor has discharged even though the extension circuit capacitor has not completely discharged, another input pulse may be received without loss of sensitivity or magnitude of the output pulse.

A feature of the present invention therefore is a split emitter capacitor with one portion thereof supplementing the other to supply emitter current during the triggered interval to extend the duration of the output pulse and the other portion being small to maintain the circuit sensitivity and output pulse amplitude.

These and further objects and features of the present invention may be more fully understood from a consideration of the following description when read in conjunction with the attached drawings wherein:

Fig. 1 is a circuit representation of a monostable amplifier embodying features of the present invention;

Fig. 2 is a typical transistor input characteristic; and

Fig. 3 is a series of curves illustrating the operation of the monostable amplifier of the present invention:

Fig. 3A illustrating the operation with both emitter and extension capacitors;

Fig. 3B illustrating the operation with only the small emitter capacitor; and

Fig. 3C illustrating the operation with only a large emitter capacitor.

Referring to Fig. 1, the input terminal 10 of the transistor trigger circuit or monopulser is coupled through the capacitor 11 to the emitter electrode 12 of transistor 13. The transistor 13 is a point contact transistor of the type disclosed in the Patent 2,524,035 granted to J. Bardeen and W. H. Brattain on October 3, 1950. The present invention is not restricted to the utilization of this type of transistor as, for example, two junction transistors, one PNP and one NPN may be interconnected to function as a point contact transistor. Such circuits are disclosed, for example, in the Patent 2,655,609 granted to W. Shockley on October 13, 1953.

Electrode current is deemed positive if it flows from the electrode into the semiconductive body. A small positive current applied to the emitter electrode 12 results in a negative current in the collector electrode 14 which exceeds the emitter current in magnitude. This current multiplication exists in most transistors of this type. If the semiconductive body is of P-type material, the normal directions of electrode current and the poling of the biasing batteries are reversed. The transistor 13 employed in the present description is assumed to be N-type, although, in accordance with the invention, the use of other known types is also contemplated.

The emitter electrode 12 of transistor 13 is connected through the varistor 16, which is poled in a direction of positive emitter current, to ground through the emitter capacitor 17 and to the base electrode 15 through the resistor 18. The base electrode 15 is also connected to ground through the base resistor 19. The collector electrode 14 is connected to the battery 23 through the resistor 22 and to the output terminal 24.

The transistor 13 and its associated circuit components, described above, form a monostable trigger circuit having a low-current stable position. A biasing path maintains the emitter electrode 12 at a potential that is slightly more negative than the potential at the base electrode 15. The biasing path is from ground through resistors 19 and 18, varistor 16 and resistor 21 to battery 23. With no input, the circuit is in a low-current quiescent, or equilibrium, position illustrated as point 43 in Fig. 2. The emitter load line, not shown, intersects the input characteristic only at point 43 in the negative or low-current positive resistance region. With such a load line, the amplifier is monostable.

The resistor 18 is utilized for stability purposes to prevent false operation when base-to-collector current is large. The base-to-collector current may be large, for example, during the quiescent condition when the atmospheric temperature is high. With a large base-to-collector current, the potential at the base electrode 15 is decreased to tend to back-bias diode 16 and to make the emitter electrode 12 more positive with respect to the base electrode 15. If the potential of the emitter electrode 12 is allowed to be more positive than the potential of the base electrode 15, the monostable amplifier will operate falsely. The resistor 18, therefore, is advantageous to cause the emitter potential to follow the base potential with changes in base-to-collector current.

The resistor 19 functions together with the transistor 13 to provide for the negative resistance characteristic. The base current is the algebraic sum of the emitter and collector current and, since the collector current is normally negative and larger in magnitude than the emitter current, the normal base current for positive emitter current will be positive. Therefore, when the transistor 13 is in its active or triggered condition, a positive emitter current will result in a positive base current which, by flowing through the large base resistor 19, makes the base electrode 15 negative with respect to the emitter electrode 12. When the base electrode 15 becomes negative with respect to the emitter electrode 12, the emitter current is increased inducing an even larger positive base current. It is this regenerative feedback which gives rise to the negative resistance characteristic shown in Fig. 2.

The junction between the varistor 16 and the capacitor 17, which is designated as junction B, is connected to a duration extension circuit 20. The circuit 20 includes the varistor 28 which is poled in a direction of positive current towards junction B. The varistor 28 is connected to ground through the extension capacitor 27, which is shunted by the resistor 26, and to battery 29 through the resistor 25. The junction between resistors 25 and 26 is designated as junction A. The circuit 20 functions, as is hereinafter described, to extend or lengthen the pulse provided by the monostable amplifier without decreasing its sensitivity.

The capacitor 27 is much larger than the capacitor 17 and the potential at junction A, when the transistor 13 is at its equilibrium condition, is negative with respect to the potential at junction B. The potential at junction B is determined by the biasing network, described above, from ground through the resistors 19 and 18, the varistor 16 and resistor 21 to the battery 23, and the potential at junction A is determined by voltage divider action of resistors 25 and 26. The varistor 28 is therefore reversed-biased so that during the quiescent, or stable, condition of transistor 13 the circuit 20 is effectively disconnected from the transistor 13.

When a positive pulse is supplied through terminal 10 to the emitter electrode 12, the transistor 13 is triggered through its negative resistance region to a high-current condition and then back through its negative resistance region to its equilibrium condition providing an amplified pulse through the output terminal 24. The positive input pulse reverse-biases the varistor 16 to allow the emitter electrode 12 to become more positive than the base electrode 15. As the emitter current increases from that corresponding to point 43 in Fig. 2 into the negative resistance region, the emitter potential decreases rapidly to forward-bias the varistor 16. The varistor 16 is therefore only reversed-biased for a brief interval when the amplifier is triggered. The purpose of varistor 16 is to allow triggering at the emitter 12. If triggering by negative pulse at the base 15 is desired, varistor 16 may be replaced by a short circuit.

Fig. 3A illustrates the voltage conditions that occur in the trigger circuit of the present invention when an input pulse is supplied through terminal 10. In the area of Fig. 3A designated "1-time slot," the potential sequence of events are shown that occur from the time a pulse is entered through the input terminal 10 until the trigger circuit is ready for the reception of the next input pulse without any loss of sensitivity. Curve C illustrates the potential conditions that occur on the collector electrode 14 or at terminal 24; curve B illustrates the potential conditions that exist at junction B; and curve A illustrates the potential conditions that exist at juncion A. Before the input pulse is supplied through terminal 10 to the emitter electrode 12, both capacitors 27 and 17 are at their maximum potentials illustrated by points 33 and 31, respectively. As described above and illustrated in Fig. 3A, the potential at junction B during the quiescent condition of the trigger circuit is at a higher, or more positive, potential than that of junction A. The potential difference though actually quite small is shown exaggerated in Fig. 3A for illustrative purposes. When an input pulse is supplied, the transistor 13 is triggered and the collector potential jumps rapidly to a less negative potential due to the operation of the transistor in its saturated state. The capacitor 17 will charge exponentially from point 33 to more negative point 41. At point 41, the potential of junction B tends to drop below that of junction A and the varistor 28 becomes forward-biased. From point 41 to point 34 both capacitors 27 and 17 charge negatively through varistor 16 and the emitter electrode 12. The rate of decrease of the emitter potential is relatively small due to the combined effect of the capacitors 27 and 17. The capacitors 27 and 17 charge together at a much slower rate than would capacitor 17 alone to effectively slow down the decay of emitter potential.

The potential at point A before triggering, or at the circuit quiescent condition, must be more positive than the cut-off potential illustrated at point 34 in Fig. 3A. The potential at point 34 in Fig. 3A is equivalent to the potential at the knee 44 of the characteristic shown in Fig. 2. This potential condition must exist as otherwise the varistor 28 does not become forward-biased. At point 34 in Fig. 3A, the transistor 13 is cut off and the collector potential decreases rapidly.

When the transistor 13 is cut off, the capacitors 27 and 17 both begin to discharge. The small emitter capacitor 17 discharges through the resistors 18 and 19 at a greater rate than does the large extension capacitor 27 through the resistor 26. As soon as the two capacitors 27 and 17 begin to discharge, the potential at point B becomes more positive than the potential at point A to reverse-bias the varistor 28. The varistor 28 is in this manner forward-biased only from point 41 to point 34 which corresponds to the time during which the capacitor 27 charges. The collector potential remains substantially at the potential of battery 23 from point 35 to point 42 during the time that the capacitors 27 and 17 are discharging.

The sensitivity of the circuit is determined by the emitter-to-base potential. During the discharge time of the capacitor 17, current flows from ground through the resistors 19 and 18 to the capacitor 17 so that the potential at the emitter electrode 12 is substantially lower than that on the base electrode 15. It is important therefore to have the capacitor 17 recharged as quickly as possible. If the capacitor 17 were in order to provide for an output pulse having a long duration, the base-to-emitter potential would remain substantially negative for a relatively long time to thereby decrease the sensitivity of the trigger circuit. By utilizing the pulse extension circuit 20, the capacitor 17 may be small to maintain the trigger circuit sensitivity while the emitter current for a long duration output pulse is provided from the extension circuit 20.

At the end of the time slot, another input pulse may be provided since the potential at junction B has reached its equilibrium condition or maximum potential. The potential at junction A as indicated in Fig. 3A does not reach its maximum at point 36 at the same time that the varistor 28 becomes forward-biased for the second time. For very high duty cycles junction A may not reach its maximum even at point 36 without loss of sensitivity.

If the extension circuit 20 is not utilized the curves shown in Fig. 3B apply. The amplitude of the output pulses is maintained but the pulse duration is much smaller. This is due to the fact that the capacitor 17 alone controls the duration. After the circuit is triggered, the capacitor 17 charges until the cut-off potential is reached at point 40 in Fig. 3B which is equivalent to point 44 in Fig. 2. The charge curve from point 39 to point 40 in Fig. 3B starts out the same as does the curve from point 33 to point 34 in Fig. 3A. The effect of capacitor 27 at point 41 in Fig. 3A, however, is not present in Fig. 3B. The sensitivity of the circuit, however, is maintained because the capacitor 17 will reach the bias potential before the end of the time slot or before the entry of the next input pulse.

If capacitor 17 is increased to a size comparable to that of capacitor 27 and the pulse extension circuit 20 is not utilized, a pulse having a sufficient duration would at first be provided through the output terminal 24. The sensitivity, however, of the trigger circuit would be greatly decreased, as illustrated in Fig. 3C. When the circuit is triggered after a relatively long quiescent interval, an output pulse of proper duration and amplitude is provided as illustrated by the curve from point 43 to point 44. At the end of the time slot, when the next input pulse is received, the potential at junction B, or of large capacitor 17, has not as yet reached its maximum. The exponential charging curve of capacitor 17 from point 45 to point 46, since it begins charging from a less negative potential, reaches the cut-off potential at point 46 in less time to provide an output pulse having both a smaller amplitude and duration.

Neither the omission of circuit 20 nor the utilization of a larger emitter capacitor and omission of the circuit 20, therefore, provides for the high duty cycle output pulse without loss of circuit sensitivity or constancy of amplitude.

In a preferred embodiment of the present invention, the output pulse has a duration of 1 millisecond and an amplitude of 20 volts. The minimum interpulse interval is 500 microseconds and the circuit components are as follows:

| | | |
|---|---|---|
| Capacitor **17** | microfarads | .03 |
| Resistor **18** | ohms | 1000 |
| Resistor **19** | do | 3000 |
| Resistor **21** | do | 50,000 |
| Resistor **22** | do | 600 |
| Battery **23** | volts | −20 |
| Resistor **25** | ohms | 50,000 |
| Resistor **26** | do | 4500 |
| Capacitor **27** | microfarad | .5 |
| Battery **29** | volts | −20 |

It is to be understood that the above-described arrangements are illustrative of the application of the principles of this invention. Numerous other arrangements may be devised by those skilled in the art without departing from the spirit and scope of the invention.

What is claimed is:

1. A sensitive pulse amplifier for supplying pulses of high duty cycle comprising a current amplifying transistor having an emitter electrode, a base electrode and a collector electrode, a feedback promoting impedance connected to said base electrode and providing with said transistor a negative resistance characteristic having a low-current positive resistance region, a negative resistance region and a high-current positive resistance region, an emitter circuit connected to said emitter electrode for providing an equilibrium condition in said low-current positive resistance region of said characteristic whereby monostable operation is effected, an emitter capacitor connected to said emitter electrode, an extension capacitor, an asymmetrically conducting impedance element connecting said extension capacitor in a parallel relationship to said emitter capacitor, said element being poled in a direction of current flow from said extension capacitor, and means for reverse-biasing said impedance element during said equilibrium condition.

2. A sensitive pulse amplifier in accordance with claim 1 wherein said extension capacitor is larger than said emitter capacitor.

3. A sensitive pulse amplifier in accordance with claim 2 wherein said impedance element is poled in the direction to permit the flow of current through said extension capacitor to extend the time said amplifier remains in its high-current region.

4. A pulse amplifier comprising a transistor having a base, emitter and collector, a feedback promoting impedance connected to said base, an input terminal connected to said emitter for receiving input triggering pulses, circuit means connected to said emitter for determining one equilibrium condition, an output terminal connected to said collector, a first emitter capacitor connected to said emitter, and a pulse extension circuit including a second emitter capacitor connected to said emitter and operative to extend the duration of the pulse provided through said output terminal, said second emitter capacitor being larger than said first emitter capacitor.

5. A pulse amplifier in accordance with claim 4 wherein said extension circuit includes means for disconnecting said extension circuit during the equilibrium condition of said amplifier.

6. A monostable trigger circuit comprising a transistor having an emitter electrode; a first capacitor connected to said emitter electrode; a second capacitor having a capacitance greater than said first capacitor; a varistor connecting said second capacitor to said emitter electrode and poled in a direction to present a high impedance at the beginning of the triggering interval and means for forward biasing said varistor at a predetermined time during said triggering interval.

7. A monostable pulse amplifier comprising a current amplification transistor having an input electrode and a control electrode, means for normally reverse biasing said input electrode with respect to said control electrode whereby said transistor is nonconducting, a feedback promoting resistor connected to said control electrode, an energy storage device connected to said input electrode, a supplementary energy storage device, switching means connecting said supplementary device to said input electrode, an input terminal connected to said input electrode for receiving an input pulse which causes said transistor to be conducting, and means effective upon said switching means at a predetermined time after the reception of an input pulse whereby said transistor remains conducting for a duration controlled by both of said storage devices.

8. A sensitive pulse amplifier for supplying pulses of high duty cycle comprising a current amplifying transistor having an emitter electrode, a base electrode and a collector electrode, a feedback promoting impedance connected to said base electrode and providing with said transistor a negative resistance characteristic having a low-current positive resistance region, a negative resistance region and a high current positive resistance region, an emitter circuit connected to said emitter electrode for providing an equilibrium condition in said low-current positive resistance region of said characteristic, means for applying a potential in the reverse direction between said emitter and base electrodes, and between said collector and base electrodes, said emitter circuit including a common junction point, an emitter capacitor connected between said emitter electrode and said junction point, an extension capacitor, an asymmetrically conducting impedance element connecting said extension capacitor to the junction of said emitter electrode and said emitter capacitor and said junction point, and circuit means connected to each side of said impedance element for reverse biasing said impedance element during said equilibrium condition and for forward biasing said impedance element when said transistor is triggered from said equilibrium condition.

9. A sensitive pulse amplifier for supplying pulses of high duty cycle comprising a current amplifying transistor having an emitter electrode, a base electrode and a collector electrode, a feedback promoting impedance connected to said base electrode and providing with said transistor a negative resistance characteristic having a low-current positive resistance region, a negative resistance region and a high current positive resistance region, an emitter circuit connected to said emitter electrode for providing an equilibrium condition in said low-current positive resistance region of said characteristic, means for applying a potential in the reverse direction between said emitter and base electrodes, and between said collector and base electrodes, said emitter circuit including an emitter capacitor connected to said emitter electrode, and a pulse extension circuit connected to said emitter electrode, said extension circuit including an extension capacitor being larger than said emitter capacitor and means for connecting said extension capacitor to said emitter electrode while said transistor is in said high current region so that the duration of the pulse provided from said pulse amplifier is increased.

10. A pulse amplifier for supplying pulses of high duty cycle comprising a current-multiplication transistor having a stable and an unstable state of operation, said transistor having an emitter electrode, a base electrode, and a collector electrode, a feedback promoting impedance connected to said base electrode, biasing means connected to said emitter electrode and to said collector electrode, a capacitive device connected to said emitter electrode, and means effective at a predetermined time after said transistor has entered said unstable state of operation to vary the capacitance of said device.

11. A pulse amplifier for supplying pulses of high duty cycle comprising a current-multiplication device having a stable and an unstable state of operation, an emitter electrode, a base electrode, and a collector electrode, a feedback promoting impedance connected to said base electrode, a biasing arrangement connected to said collector electrode, a first capacitive device connected to said emitter electrode, a second capacitive device arranged in parallel relationship to said first device and connectable thereto, a charging path for said second capacitive device including a normally reverse biased unilateral conducting device connecting said first and second capacitive devices, means operative in response to the operation of said current-multiplication device from said stable state to said unstable state to charge said first capactive device and to forward bias said unilateral conducting device, and means effective when said current-multiplication device returns to said stable state to discharge said first and said second capacitors.

12. A pulse amplifier for supplying pulses of high duty cycle comprising a current-multiplication device having stable and unstable states of operation, an emitter electrode, a base electrode, and a collector electrode, a feedback promoting impedance element connected to said base electrode, a biasing arrangement connected to said collector electrode, a first capacitive device, a second capacitive device arranged in parallel relationship to said first capacitive device and connectable thereto, a first unilateral conducting device connecting said first capacitive device to said emitter electrode and poled in a direction of positive emitter current, means for charging said first capacitor through said first unilateral device when said current-multiplication device enters said unstable state of operation, a second unilateral conducting device connecting said second capacitive device to the junction between said first capacitive device and said first unilateral conducting device and poled in a direction of positive emitter current, means for forward biasing said second unilateral device in response to the charge on said first capacitive device at a predetermined time after said current-multiplication device has entered said unstable state of operation so that said second capacitive device is charged by said charging means through said first unilateral conducting device, and means operable to discharge said first and second capacitive devices when said current-multiplication device is operating in said stable state of operation.

References Cited in the file of this patent

UNITED STATES PATENTS

| | | |
|---|---|---|
| 2,584,990 | Dimond | Feb. 12, 1952 |
| 2,595,208 | Bangert | Apr. 29, 1952 |
| 2,644,895 | Lo | July 7, 1953 |
| 2,757,243 | Thomas | July 31, 1956 |
| 2,759,179 | Kircher | Aug. 14, 1956 |
| 2,786,964 | Witt et al. | Mar. 26, 1957 |